(12) United States Patent
Epker et al.

(10) Patent No.: US 10,410,270 B2
(45) Date of Patent: Sep. 10, 2019

(54) GRANULAR SELECTION AND SCHEDULING OF QUERIES

(71) Applicant: GOOGLE INC., Mountain View, CA (US)

(72) Inventors: Karthic Neelands Epker, San Francisco, CA (US); Ying Liu, Sunnyvale, CA (US); Alan Howard Davis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 433 days.

(21) Appl. No.: 15/389,441

(22) Filed: Dec. 22, 2016

(65) Prior Publication Data
US 2018/0182012 A1 Jun. 28, 2018

(51) Int. Cl.
*G06Q 30/06* (2012.01)
*G06Q 50/12* (2012.01)
(Continued)

(52) U.S. Cl.
CPC ..... *G06Q 30/0625* (2013.01); *G06F 16/2471* (2019.01); *G06F 16/951* (2019.01);
(Continued)

(58) Field of Classification Search
None
See application file for complete search history.

(56) References Cited

U.S. PATENT DOCUMENTS

| 7,979,457 B1 * | 7/2011 | Garman | G06Q 10/02 707/768 |
| 8,898,184 B1 * | 11/2014 | Garman | G06Q 10/02 707/768 |

(Continued)

OTHER PUBLICATIONS

Jones, C., and Orr, A., "Local Commercial and Industrial Rental Trends and Property Market Constraints," Urban Studies, vol. 36, No. 2, pp. 223-237, Feb. 1999. (Year: 1999).*

(Continued)

*Primary Examiner* — Nicholas D Rosen
(74) *Attorney, Agent, or Firm* — Johnson, Marcou & Isaacs, LLC

(57) ABSTRACT

A search system extracts, for each property known to the system, historical information comprising data for itineraries associated with a partner system associated with the property. The search system determines, for each property-itinerary combination, an update frequency comprising based on historical information data. The search system extracts a history of user impressions of itineraries comprising the property. The search system determines a relative impression weight for each itinerary, an absolute impression weight for the property, and an expected impression weight of each property-itinerary combination. For each current property-itinerary combination, the search system determines a utility value based on the expected update frequency and expected impression weight to satisfy bandwidth constraints for each partner system. The search system schedules, for each partner system, queries for property-itinerary combinations having values greater than threshold utility value.

20 Claims, 6 Drawing Sheets

(51) Int. Cl.
  *H04L 12/26* (2006.01)
  *G06F 16/2458* (2019.01)
  *G06F 16/951* (2019.01)
  *G06Q 50/14* (2012.01)

(52) U.S. Cl.
  CPC ......... *G06Q 30/0623* (2013.01); *G06Q 50/12* (2013.01); *H04L 43/0876* (2013.01); *H04L 43/16* (2013.01); *G06Q 50/14* (2013.01)

(56) References Cited

U.S. PATENT DOCUMENTS

| | | | | |
|---|---|---|---|---|
| 9,342,837 B2* | 5/2016 | Garman | ................. | G06Q 10/02 |
| 9,449,288 B2* | 9/2016 | Swann | ................. | G06Q 10/02 |
| 9,727,649 B2* | 8/2017 | Garman | ................. | G06Q 10/02 |
| 9,870,540 B2* | 1/2018 | Swann | ................. | G06Q 10/02 |
| 2001/0054020 A1* | 12/2001 | Barth | ................. | G06Q 10/02 705/37 |
| 2013/0041902 A1* | 2/2013 | Swann | ................. | G06Q 10/02 707/737 |
| 2013/0304526 A1* | 11/2013 | Boyd | ................. | G06Q 10/02 705/5 |
| 2015/0073868 A1* | 3/2015 | Garman | ................. | G06Q 10/02 705/7.31 |
| 2016/0203422 A1* | 7/2016 | Demarchi | ................. | G06F 16/29 705/6 |
| 2016/0260182 A1* | 9/2016 | Garman | ................. | G06Q 10/02 |
| 2016/0350681 A1* | 12/2016 | Swann | ................. | G06Q 10/02 |

OTHER PUBLICATIONS

Schaefers, A., "Hotel Occupancies and Revenue Decline," Honolulu Star-Bulletin, Honolulu, Hawaii, Jun. 1, 2007. (Year: 2007).*

* cited by examiner

GRANULAR SELECTION AND SCHEDULING OF QUERIES

TECHNICAL FIELD

The present disclosure relates to scheduling queries for information to provide to users.

BACKGROUND

Search systems may communicate with partner systems to provide information to users. Partner systems may provide the search system with updated information as information changes. However, many partner systems do not provide search systems with updated information and only provide information in response to queries by search systems. Processing queries from search systems may be costly for partner systems, and partner systems may only provide a limited bandwidth allotted for queries by search systems. Because of the limited bandwidth available, search systems are challenged to provide information that is current to users while operating within the bandwidth constraints.

SUMMARY

Techniques herein provide computer-implemented methods to schedule queries for information to present to users. In an example embodiment, a search system retrieves a current list of properties for partner systems. The search system, for each property, extracts historical information comprising data for itineraries comprising the property from the same partner system. The search system, for each property, determines an expected number of changes for each property-itinerary combination based on the historical information data. The search system, for each property, determines an update frequency for each property-itinerary combination comprising an average expected daily change rate for each property-itinerary combination. The search system, for each property, extracts a history of user impressions of itineraries associated with the partner system associated with the property. The search system, for each property, determines a relative impression weight for each itinerary associated with the partner system associated with the property and an absolute impression weight for the property from the history of user impressions. The search system determines, for each property, an expected impression weight of each property-itinerary combination comprising the property based on the itinerary impression weights for itineraries associated with the respective partner system and property impression weight associated with the property. For each partner system, the search system determines a utility value for each current property-itinerary combination associated with the respective partner system based on the expected update frequency and expected impression weight. The search system ranks, for each partner system, the property-itinerary combinations according to utility value, determines bandwidth constraints for each partner system, determines a threshold utility value for each partner system that will satisfy bandwidth constraints, and schedules, for each partner system, queries for property-itinerary combinations having values greater than threshold utility value for the respective partner system. The search system conducts queries with each partner system according to the corresponding query schedule.

In certain other example aspects described herein, systems and computer program products to schedule queries for information to present to users are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
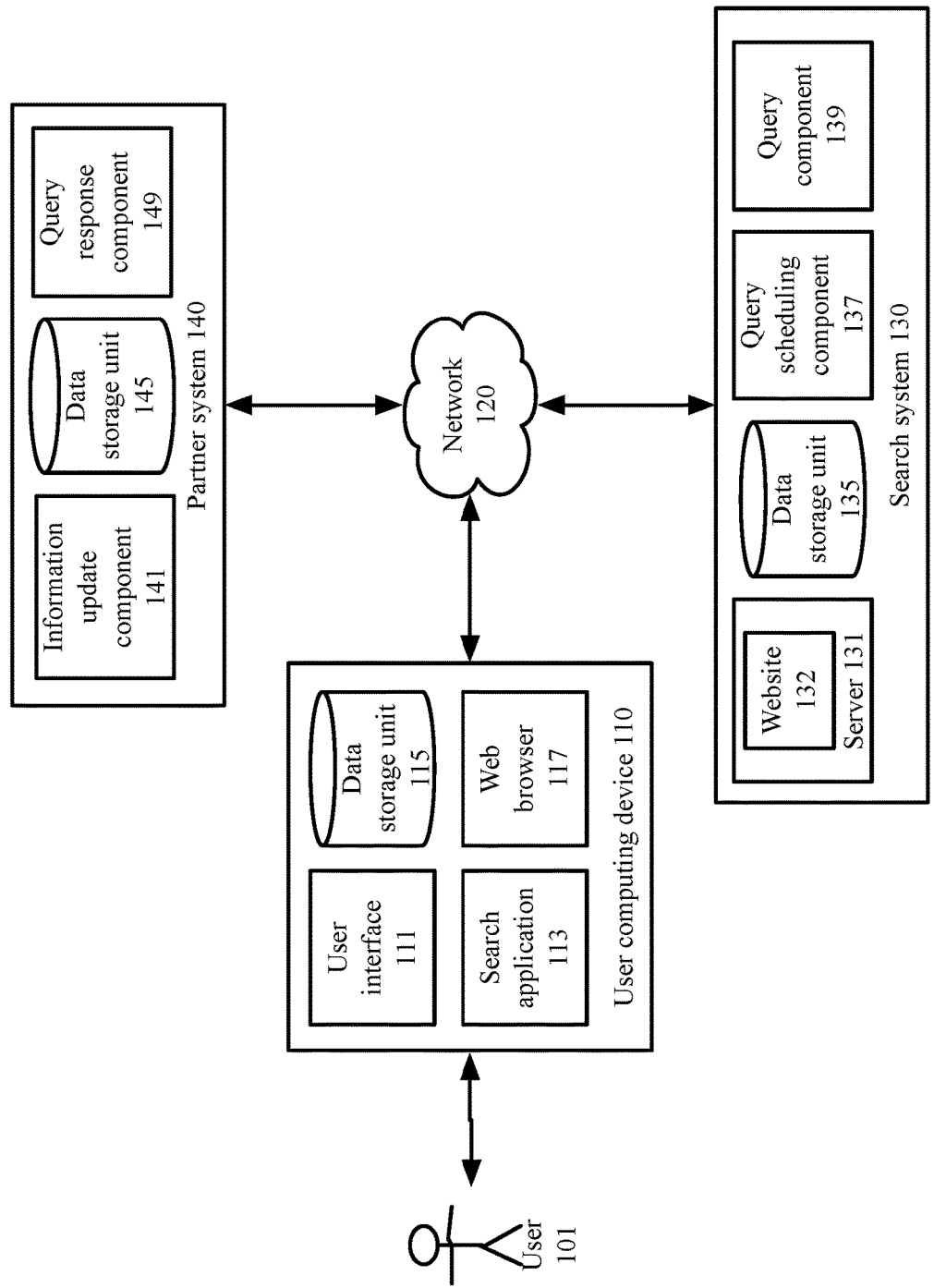
FIG. 1 is a block diagram depicting a system for scheduling, by a search system, information queries to partner systems, in accordance with certain example embodiments.

The example embodiments described herein provide computer-implemented techniques for scheduling, by a search system, information queries to partner systems.

In an example embodiment, a search system retrieves a current list of properties associated with one or more partner systems. For each property, the search system extracts historical information comprising data for itineraries comprising the property. The search system determines a number of changes for each property-itinerary combination of a group of similar property-itinerary combinations based on the historical information data. The search system determines an update frequency for each property-itinerary combination. The search system, for each property, extracts a history of user impressions of itineraries associated with the partner system, wherein the partner system is associated with the property. For each property, the search system determines a relative impression weight for each itinerary corresponding to the partner system associated with the property and an absolute impression weight for the property based on the history of user impressions of itineraries associated with the partner system. The search system, for each property, determines an expected impression weight of each itinerary based on the corresponding itinerary impression weights and respective property impression weight. For each partner system, the search system determines a utility value for each property-itinerary combination based on the corresponding expected update frequency and corresponding expected impression weight. For each partner system, the search system ranks the property-itinerary combinations according to utility value, determines bandwidth constraints, determines a threshold utility value that will satisfy respective bandwidth constraints set by the partner system, and schedules queries for property-itinerary combinations having values greater than threshold utility value for the respective partner system. The search system conducts queries with partner systems according to the generated query schedules.

A search system retrieves a current list of properties associated with one or more partner systems. In an example embodiment, properties comprise one or more hotel data. In other example embodiments, properties comprise accommodation data, flight or other transportation data, and/or event data. For example, a property comprises a particular room at a particular hotel, a vacation rental cabin, or a music concert scheduled for a certain day at a certain location. In an example embodiment, the search system operates a search service and maintains a cache of property data based on prior user search data and/or data received from one or more partner systems. In this example embodiment, the search system provides property data associated with one or more properties to users who search for itineraries comprising the one or more properties. For example, an itinerary comprises a request to rent or use a property between a start date and an end date or a request to rent or use a property for a certain number of days or nights starting on a start date. In an example embodiment, the search system maintains a cache of property data and all possible itineraries that users could request that comprise the properties. Example property data comprises price data. Example itineraries may each comprise a start date, an end date, a property identifier, a price, and a date of a price change if the price changed from a previous price.

The search system retrieves historical information data for itineraries comprising the property. In an example embodiment, the historical information data comprises historical price data or other data associated for itineraries comprising the property. In this example embodiment, the historical information data comprises historical price data or other data determined previously via information queries to the partner system and/or data otherwise received from the partner system. In the example embodiment, the search system extracts, for each itinerary comprising the property and from the historical information data, the dates at which the itinerary price changed and the start date of the itinerary. In an example, the search system generates a table for each itinerary comprising the extracted historical information data comprising the date the price changed and the start date of the itinerary. In an example, the search system calculates, from the historical information data, a relative length of time comprising a length of time between the date of each change in price and the start date associated with the itinerary. In this example, the search system adds the relative length of time for each itinerary price change to the table. For example, a price for a particular itinerary comprising a hotel room with a start date of Dec. 30, 2016 changed on Nov. 30, 2016 (at 30 days prior to start date) to $250, on Dec. 10, 2016 (20 days prior to start date) to $215, on Dec. 20, 2016 (10 days prior to start date) to $295, on Dec. 25, 2016 (5 days prior to start date) to $350, on Dec. 28, 2016 (2 days prior to start date) to $375, on Dec. 29, 2016 (1 day prior to start date) to $320, and on Dec. 30, 2016 (the start date for which the reservation applied) to $295.

In an example embodiment, the search system further extracts, for each itinerary comprising the property and from the historical information data, dates of change in price and start dates for one or more itineraries that are similar to the itinerary. For example, similar itineraries are directed to the same property and have equal or similar lengths of stay. For example, similar itineraries for a 5-day itinerary comprise other 5-day itineraries. In another example, similar itineraries for a 5-day itinerary comprise itineraries comprising lengths of stay of 5-days plus or minus one day. In another example, similar itineraries are directed to the same property and have the same start date as the itinerary. For example, similar itineraries for an itinerary with a start date of Jan. 5, 2017 comprise other itineraries with a start date of Jan. 5, 2017. In an example, the search system generates a table for each similar itinerary comprising the extracted historical information data comprising the date the price changed and the start date of the itinerary. In an example, the search system calculates, for each similar itinerary, from the historical information data, a relative length of time comprising a length of time between the date of each change in price and the start date associated with the similar itinerary The search system determines a number of changes for each property-itinerary combination and for each of the property-itinerary combinations similar to the property-itinerary combination based on the historical information data. In an example embodiment, the search system may determine an average daily change rate for a group comprising the property-itinerary combination and each of the property-itinerary combinations similar to the property-itinerary combination. For example, a particular property-itinerary combination A changed price 10 times over the last 100 days, a similar property-itinerary combination B changed price 15 times over the last 100 days, and a similar property-itinerary combination C changed price 20 times over the last 100 days, resulting in an average change rate of 15 times over 100 days and an average daily change rate of 0.15 changes per day. In another example, instead of determining an average daily change rate, the search system determines, for the group comprising the property-itinerary combination and each of the property-itinerary combinations similar to the property-itinerary combination, an average monthly change rate, an average hourly change rate, an average yearly change rate, or another change rate specifying a number of changes over an appropriate duration of time.

The search system determines, for each property-itinerary combination comprising the property, an update frequency. In an example, the update frequency comprises comprising an average expected daily change rate or other expected change rate for a group comprising the respective property-itinerary combination and one or more property-itinerary combinations similar to the property-itinerary combination.

The search system, for each property, extracts a history of user impressions of property-itinerary combinations associated with a partner system corresponding to the property. For example, the history of impressions comprises a record of date and time information for when one or more users using the search system searched for and received information associated with a particular itinerary comprising the property, a start date associated with each property-itinerary combination, an end date associated with each property-itinerary combination. In an example, the record is divided into time periods and includes a count of how many times the information for a particular property-itinerary combination was requested for each time period. For example, on a first day, the search system received 1000 requests for the property-itinerary combination, on a second day following the first day, the search system received 900 requests for the property-itinerary combination, and on a third day following the second day, the search system received 1800 requests for the property-itinerary combination. In an example, the search system comprises a history of user impressions for each day of the past three months, the past six months, the past year, the past two years, the past five years, or other appropriate time period. In an example embodiment, the search system determines a total number of times the information for each particular property-itinerary combination was requested during a period by determining a sum of individual periods. For example, the search system adds the number of requests for each of 90 days for a particular property-itinerary combination to arrive at a total number of requests for a 90-day period for the particular property-itinerary combination.

The search system determines a relative itinerary impression weight for each itinerary. For example, the search system, from the history of user impressions, determines the number of times that users requested information for each itinerary over a certain period of time. For example, a user impression comprises a request for a user for data associated with the respective itinerary. In this example, for each itinerary, the search system determines a relative impression weight by dividing the number of times that users requested information for the itinerary by the sum of the number of times that users requested information for the itinerary plus the number of times that users requested information for all other itineraries. For example, the relative impression weight comprises a proportion, percentage, fraction, or other expression. For example, the relative impression weight comprises a number between 0 and 1. For example, partner system A comprises 4 itineraries: itinerary 1, itinerary 2, itinerary 3, and itinerary 4. In this example, based on the history of user impressions, itinerary 1 was requested 100 times, itinerary 2 was requested 200 times, itinerary 3 was requested 50 times, and itinerary 4 was requested 150 times over a certain time period. In this example, the relative impression weight for itinerary 2 is (200 times)/(200 times+100 times+50 times+150 times)=0.40.

The search system determines an absolute impression weight for the property. For example, the search system determines, from the history of user impressions, a total number of past user requests for property-itinerary combinations comprising the property. In this example, the search system divides the total number of past user requests for property-itinerary combinations comprising the property by the time period associated with the history of user impressions to arrive at an absolute impression rate. For example, the history of user impressions comprises user impression data for the past 90 days and the total number of past user requests for property-itinerary combinations comprising the property is 9000 requests. In this example, the absolute impression weight for the property comprises 100 requests per day. In other examples, absolute impression weights may be determined as a number of requests per month, a number of requests per hour, a number of requests per week, a number of requests per year, or a number of request per other appropriate period of time.

The search system determines, for each property, an expected impression weight of each itinerary based on the respective itinerary impression weights and respective absolute property impression weights. For example, the search system multiplies the itinerary impression weight for each itinerary by the absolute property impression weight for the property to determine an expected impression weight for each property-itinerary combination. For example, the itinerary impression weight for a particular itinerary is 0.02, the absolute impression weight for the property is 10,000 requests per day, and the resulting expected impression weight of the property-itinerary combination is 500 requests per day.

For each partner system, the search system determines a utility value for each property-itinerary combination associated with the partner system based on the determined expected update frequency and the determined expected impression weight for the corresponding property-itinerary combination. As previously discussed, the search system may determine an expected update frequency for each property-itinerary combination based on historical information data. Also, the search system may determine an expected impression weight of each property-itinerary combination based on a history of user impressions of itineraries describing when users requested information concerning the property-itinerary combinations. In an example embodiment, the search system determines a utility value for each property-itinerary combination associated with a particular partner system based on the expected update frequency corresponding to the property-itinerary combination and the expected impression weight corresponding to the property-itinerary combination. For example, the search system determines a utility value for each property-itinerary combination associated with a particular partner system by dividing the corresponding expected impression weight by the expected update frequency. In an example, a utility value is a unit-less value. For example, for a particular property-itinerary combination, the expected impression weight is 500 requests per day and the expected update frequency is 0.1 changes per day. In this example, the utility value for the particular property itinerary combination is 5,000.

The search system ranks the property-itinerary combinations according to utility value for each partner system. In an example, the search system ranks, in a separate list for each partner system, the property-itinerary combinations in ascending or descending order according to utility value.

The search system determines bandwidth constraints for each partner system. For example, for each partner system, the search system is limited to a certain number of queries per time period for property-itinerary combinations. In another example, for each partner system, the search system is otherwise limited to a certain number queries per second, queries per minute, or queries per other defined unit of time. In an example, each partner system defines a bandwidth usage for the time period to the search system. The bandwidth usage may vary over time so the search system may communicate, via the network, with the partner system to determine the current bandwidth constraints. In an example, the search system determines a bandwidth usage for each property-itinerary combination on the list of property-itinerary combinations ranked according to utility value.

The search system determines a threshold utility value for each partner system that will satisfy the bandwidth constraints. In an example embodiment, the search system chooses a threshold utility value such that the sum of the bandwidth usages for querying each property-itinerary combination above the utility value would approach but not exceed the total allowed bandwidth usage. For example, the search system determines a threshold utility value for a partner system that uses 99.5% of the allowed bandwidth usage.

The search system schedules, for each partner system, queries for property-utility values greater than the threshold utility value for the respective partner system. For example, the search system removes from each partner system list the property-itinerary combinations that comprise a lower utility value than the determined utility value threshold. Further, the search system schedules or spaces the queries such that any further bandwidth constraints are satisfied. For example, a partner system may allow 60,000 queries per minute but no more than 1,000 queries per second. In this example, the search system may schedule the queries in order based on the list of property-itinerary combinations ranked according to utility value in slots of 1,000 queries that are sent in batches at one second intervals.

The search system conducts the queries the partner systems according to the query schedules. In an example, the search system conducts the queries with the partner systems according to the query schedules by submitting each query at the scheduled time over the network to the appropriate partner system. In an example query comprises a property identifier and a description of an itinerary-property combination comprising a start date and a termination date. For example, the search system submits a query for an itinerary-property combination comprising an itinerary between Dec. 5, 2017 and Dec. 15, 2017 for property A. In this example, the partner system receives each query over the network and transmits a response to the query over the network comprising updated information for the property-itinerary combination. In this example, the search system receives, over the network, the responses to each query submitted to the partner system comprising the updated property-itinerary information. For example, the updated property-itinerary combination comprises updated price information. In an example, the search system determines query schedules and/or modifies existing query schedules at predetermined intervals. For example, the search system determines a new query schedule for each partner system every 30 seconds, every 5 minutes, every hour, once a day, or at another appropriate interval. For example, the search system may review current property-itinerary combinations, determine a utility value for each property-itinerary combination and bandwidth constraints, and schedule property-itinerary combination queries. In an example, the search system provides the updated information received from the one or more partner systems for property-itinerary combinations to one or more users in response to one or more queries for the property-itinerary combinations. The search system receives an example user query for a particular property-itinerary combination over the network and provides a response to the query comprising the updated information for the particular property-itinerary combination.

By using and relying on the methods and systems described herein, the search system and one or more partner systems enable users to receive fresh, updated information when querying for data provided by search systems on behalf of partner systems. By using and relying on the methods and systems described herein, the search system may schedule queries for information from partner systems according to utility values determined from an expected update frequency and expected impression weights and query only the queries having utility values above a threshold utility value based on bandwidth constraints specified by partner systems. As such, the systems and methods described herein may provide for ranking queries for property-itinerary combinations to provide the most up-to-date information to users according to when they are predicted to access content while not exceeding, via querying, bandwidth constraints set by partner systems.

Example System Architecture

Turning now to the drawings, in which like numerals indicate like (but not necessarily identical) elements throughout the figures, example embodiments are described in detail.

FIG. 1 is a block diagram depicting a system 100 for scheduling, by a search system 130, information queries to partner systems 140, in accordance with certain example embodiments. As depicted in FIG. 1, the system 100 includes network computing devices 110, 130, and 140 that are configured to communicate with one another via one or more networks 120. In some embodiments, a user associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, and 140 are operated by users 101, search system 130 operators, and partner system 140 operators, respectively.

An example user computing device 110 comprises a user interface 111, a search application 113, a data storage unit 115, and a web browser 117.

An example user interface 111 enables the user 101 to interact with the search application 113 and/or web browser 117. For example, the user interface 111 may be a touch screen, a voice-based interface, or any other interface that allows the user 101 to provide input and receive output from an application or module on the user computing device 110.

An example search application 113 enables a user 101 to submit queries for itinerary-property combinations via the network 120 to the search system 130. In an example embodiment, the search application 113 comprises a program, function, routine, applet, or similar entity that exists on and performs its operations on the user computing device 110. In certain example embodiments, the user 101 must install the search application 113 and/or make a feature selection on the user computing device 110 to obtain the benefits of the techniques described herein. In an example embodiment, the user 101 may access the search application 113 on the user computing device 110 via the user interface 111. In an example embodiment, the search application 113 may be associated with the search system 130. In an example embodiment, one or more functions herein described as performed by the search application 113 may also be performed by a web browser 117 application, for example, a web browser 117 application associated with a search system website 132 or associated with the search system 130. In certain example embodiments, one or more functions herein described as performed by the search application 113 may also be performed by the user computing device 110 operating system.

An example data storage unit 115 comprises a local or remote data storage structure accessible to the user computing device 110 suitable for storing information. In an example embodiment, the data storage unit 115 stores encrypted information, such as HTML5 local storage.

An example web browser 117 enables the user 101 to interact with web pages, for example, the search system website 132, using the user computing device 110. In an example embodiment, the user 101 may access the search system website 132 via the web browser 117. In certain example embodiments described herein, one or more functions performed by the search application 113 may also be performed by a web browser 117 application associated with the search system 130. In certain example embodiments, one or more functions herein described as performed via the web browser 117 may also be performed via the search application 113.

An example search system 130 comprises a web server 131, a website 132, a data storage unit 135, a query scheduling component 137, and a query component 139.

An example web server 131 provides content accessible by the user 101 through the web browser 117 and/or search application 113 on the user computing device 110, including but not limited to html documents, images, style sheets, and scripts. In an example embodiment, the server 131 supports the search system website 132.

An example website 132 comprises a search website 132 provided by the search system 130 that enables users 101 to search information for one or more property-itinerary combinations. In an example embodiment, the search system 130 schedules queries for the one or more partner systems 140 to provide updated information for property-itinerary combinations that may be queried by users 101 via the website 132 or via search applications 113 of one or more user computing devices 110.

An example data storage unit 135 comprises a local or remote data storage structure accessible to the user computing device 110 suitable for storing information. In an example embodiment, the data storage unit 115 stores encrypted information, such as HTML5 local storage. In an example embodiment, the data storage unit 135 comprises a cache of historical information data associated with property-itinerary combinations, data comprising historical impressions of users 101 for property-itinerary combinations, and current price data, accessible by the search system 130, for property-itinerary combinations associated with one or more partner systems 140

An example query scheduling component 137 may retrieve a current list of properties for partner systems 130. The query scheduling component 137 may extract historical information comprising data for itineraries comprising the property. The query scheduling component 137 may determine a number of changes for each property-itinerary combination based on the historical information data. The query scheduling component 137 may determine an update frequency comprising an average expected daily change rate for each property-itinerary combination. The query scheduling component 137 may extract a history of user impressions of itineraries comprising the property. The query scheduling component 137 may determine a relative impression weight for each itinerary and an absolute impression weight for the property. The query scheduling component 137 may determine an expected impression weight of each property-itinerary combination based on the itinerary impression weights and property impression weights. For each current property-itinerary combination, the query scheduling component 137 may determine a utility value based on the expected update frequency and expected impression weight. The query scheduling component 137 may rank the property-itinerary combinations according to utility value for each partner system, may determine bandwidth constraints for each partner system 140, determines a threshold utility value for each partner system that will satisfy bandwidth constraints, and may schedule, for each partner system, queries for property-itinerary combinations having values greater than threshold utility value for the respective partner system 140 and that satisfy bandwidth constraints set by one or more partner systems 140. In an example, the query scheduling component 137 queries, via the network 120, each of the one or more partner systems 140 to determine current bandwidth constraints applicable to the respective partner system 140 and receive, via the network 120, the current bandwidth constraints.

An example query component 139 conducts queries with partner systems 140 according to the query schedules determined by the query scheduling component 137. For example, the query component 139 receives from the query scheduling component 137 a query schedule for each partner system 140. In an example, the query component 139 communicates, via the network 120, with each partner system 140 to submit queries according to the received query schedule and to receive updated information from partner systems 140 in response to queries.

An example partner system 140 comprises an information update component 141, a data storage unit 145, and a query response component 149.

An example information update component 141 updates information associated with one or more properties and property-itinerary combinations. In an example, the information update component may communicate via the network 120 with a pricing system that updates pricing information for one or more properties and/or property-itinerary combinations and receives, via the network 120, the updated pricing information for the one or more properties and/or property-itinerary combinations.

An example data storage unit 145 comprises a local or remote data storage structure accessible to the partner system 140 suitable for storing information. In an example embodiment, the data storage unit 145 stores encrypted information, such as HTML5 local storage.

An example query response component 149 receives queries for one or more property-itinerary combinations over the network 120 from the search system 130 according to a query schedule determined by the search system 130. In an example, the query response component 149 also provides, or provides upon request, current bandwidth constraints of the partner system 140 to the search system 130 via the network 120.

Figure 6:
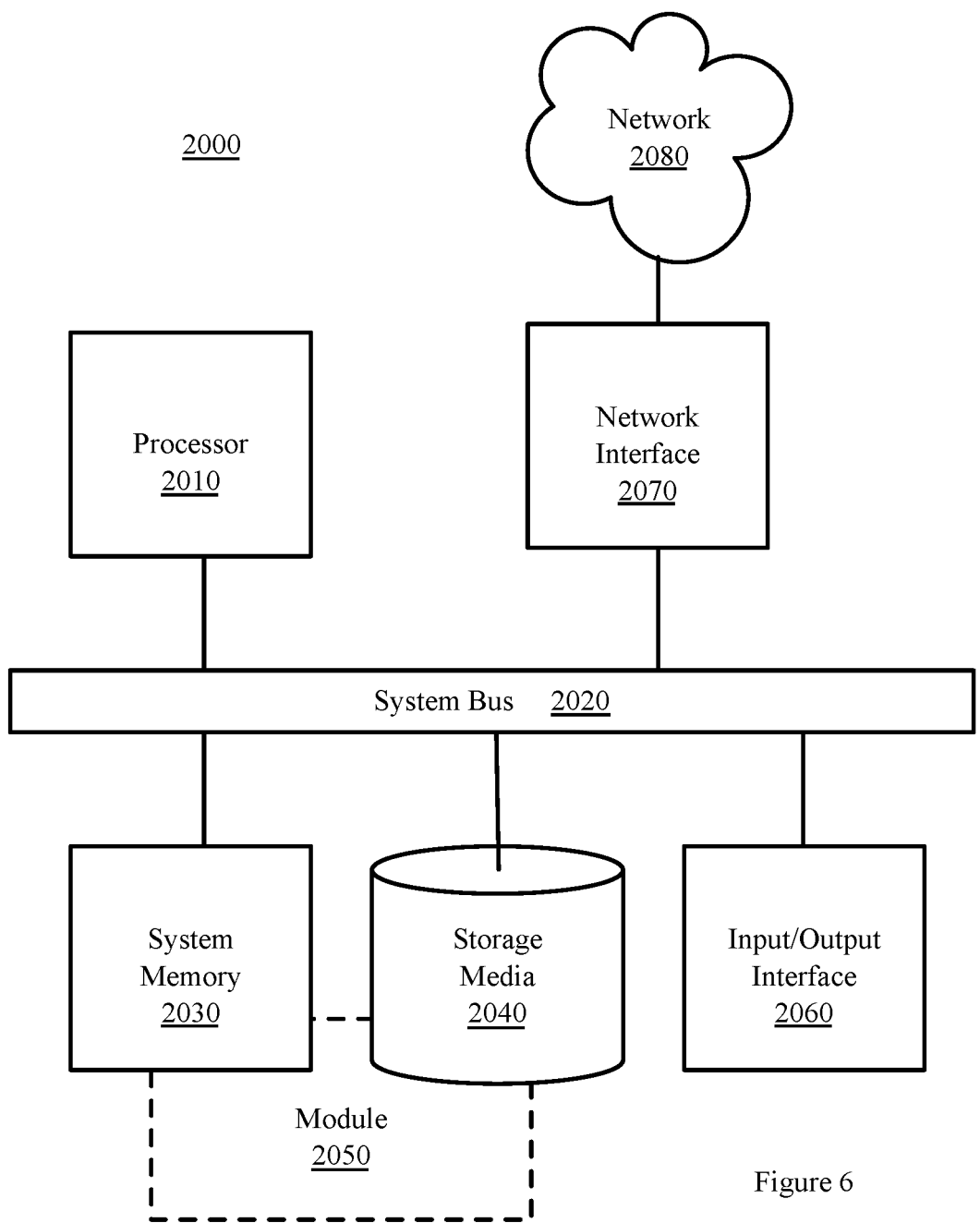
FIG. 6 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 6. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 6. The computing machines discussed herein may communicate with one another, as well as with other computing machines or communication systems over one or more networks, such as network 120. The network 120 may include any type of data or communications network, including any of the network technology discussed with respect to FIG. 6.

In example embodiments, the network computing devices and any other computing machines associated with the technology presented herein may be any type of computing machine such as, but not limited to, those discussed in more detail with respect to FIG. 6. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 6. The computing machines discussed herein may communicate with one another, as well as with other computing machines or communication systems over one or more networks, such as network 120. The network 120 may include any type of data or communications network, including any of the network technology discussed with respect to FIG. 6.

Example Processes

The example methods illustrated in FIGS. 2-5 are described hereinafter with respect to the components of the example operating environment 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
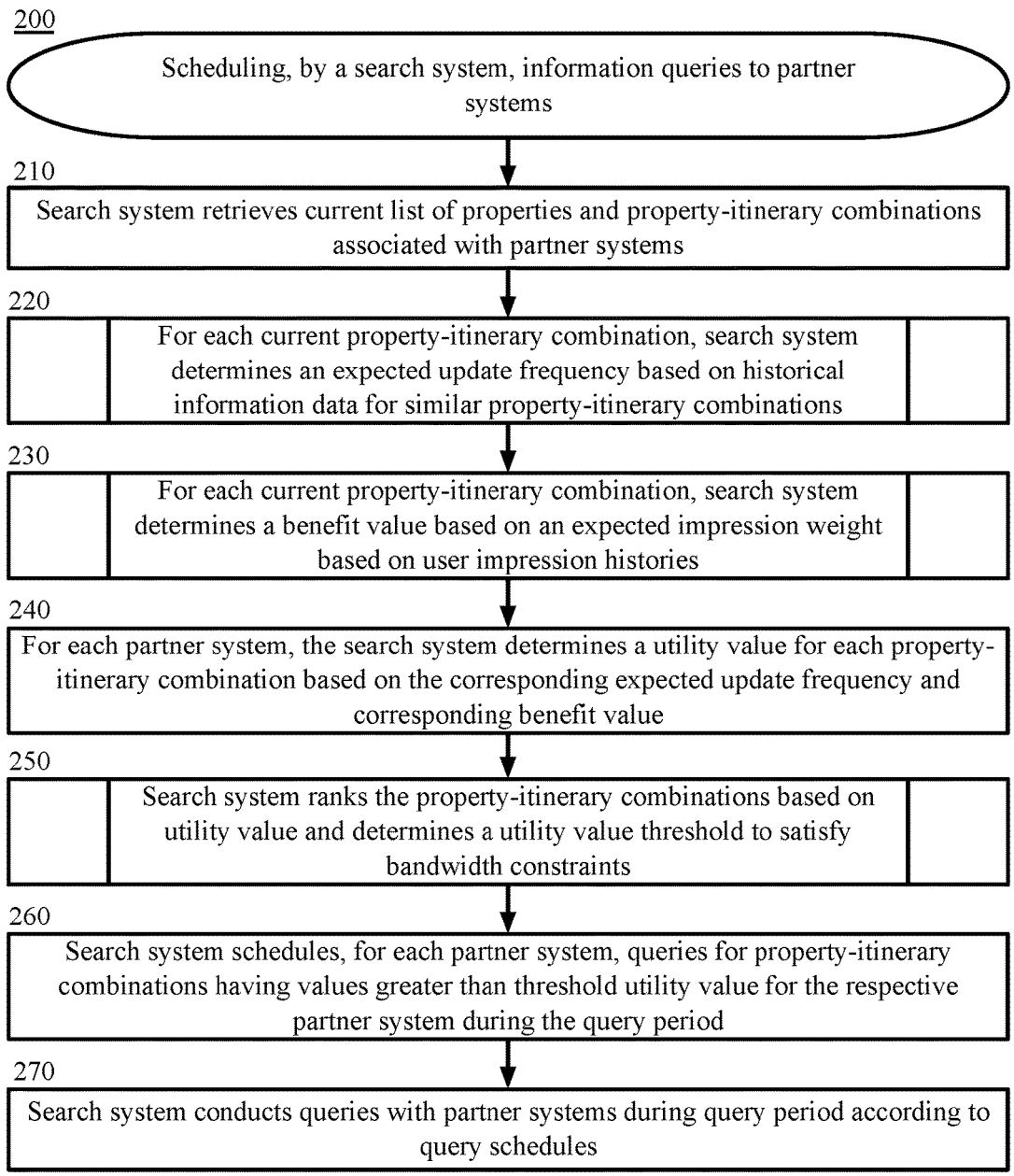
FIG. 2 is a block flow diagram depicting a method for scheduling, by a search system, information queries to partner systems, in accordance with certain example embodiments.

FIG. 2 is a block diagram depicting a method 200 for scheduling, by a search system 130, information queries to partner systems 140, in accordance with certain example embodiments. The method 200 is described with reference to the components illustrated in FIG. 1.

In block 210, the search system 130 retrieves a current list of properties and property-itinerary combinations associated with one or more partner systems 140. In an example embodiment, properties comprise one or more hotel data. In other example embodiments, properties comprise accommodation data, flight or other transportation data, and/or event data. For example, a property comprises a particular room at a particular hotel, a vacation rental cabin, or a music concert scheduled for a certain day at a certain location. In an example embodiment, the search system operates a search service and maintains a cache of property data based on prior user search data and/or data received from one or more partner systems. In this example embodiment, the search system provides property data associated with one or more properties to users who search for itineraries comprising the one or more properties. For example, a property-itinerary combination comprises a request to rent or use a property between a first date and a second date or a request to rent or use a property for a certain number of days or nights starting on an initial date. In an example embodiment, the search system 130 maintains a cache of property data and all possible itineraries that users could request that comprise the properties. Example property data comprises price data. Price data may be valued in currency values, awards points, or other system of valuation. Example itineraries may each comprise a start date, an end date, a property identifier, a price, and a date of a price change if the price changed from a previous price.

In block 220, for each current property-itinerary combination, the search system 130 determines an expected update frequency based on historical information data for similar property-itinerary combinations. The method for determining, by a search system 130, an expected update frequency for each property-itinerary combination based on historical change data for similar property-itinerary combinations is described in more detail hereinafter with reference to the method described in FIG. 3.

Figure 3:
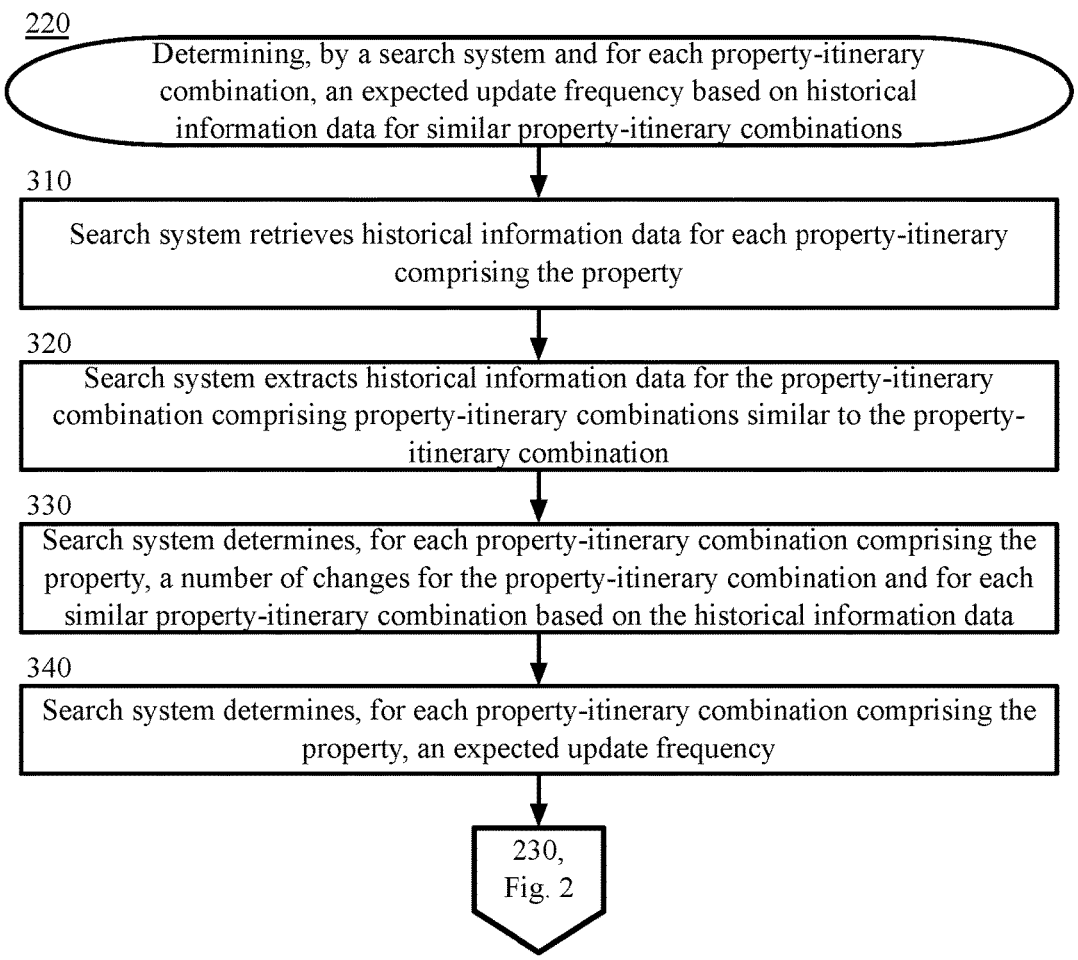
FIG. 3 is a block flow diagram depicting a method for determining, by a search system and for each property, an expected update frequency for each property-itinerary combination based on an information change history for similar properties, in accordance with certain example embodiments.

FIG. 3 is a block diagram depicting a method 220 for determining, by a search system 130, an expected update frequency for each property-itinerary combination based on historical change data for similar property-itinerary combinations, in accordance with certain example embodiments. The method 220 is described with reference to the components illustrated in FIG. 1.

In block 310, the search system 130 retrieves historical information data for property-itinerary combinations comprising the property. In an example embodiment, the historical information data comprises historical price data or other data associated for itineraries comprising the property. In this example embodiment, the historical information data comprises historical price data or other data determined previously via information queries to the partner system and/or data otherwise received from the partner system. In the example embodiment, the search system extracts, for each itinerary comprising the property and from the historical information data, the dates at which the itinerary price changed and the start date of the itinerary. In an example, the search system generates a table for each itinerary comprising the extracted historical information data comprising the date the price changed and the start date of the itinerary. In an example, the search system calculates, from the historical information data, a relative length of time comprising a length of time between the date of each change in price and the start date associated with the itinerary. In this example, the search system adds the relative length of time for each itinerary price change to the table. For example, a price for a particular itinerary comprising a hotel room with a start date of Dec. 30, 2016 changed on Nov. 30, 2016 (at 30 days prior to start date) to $250, on Dec. 10, 2016 (20 days prior to start date) to $215, on Dec. 20, 2016 (10 days prior to start date) to $295, on Dec. 25, 2016 (5 days prior to start date) to $350, on Dec. 28, 2016 (2 days prior to start date) to $375, on Dec. 29, 2016 (1 day prior to start date) to $320, and on Dec. 30, 2016 (the start date for which the reservation applied) to $295. In an example embodiment, the historical information data comprises itineraries comprising itinerary start dates and itinerary end dates for each day of the past time period. For example, the start date is the start date for the itinerary and the end date comprises an end date on which the itinerary ends.

In an example embodiment, the search system further extracts, for each itinerary comprising the property and from the historical information data, dates of change in price and start dates for one or more itineraries that are similar to the itinerary. For example, similar itineraries are directed to the same property and have equal or similar lengths of stay. For example, similar itineraries for a 5-day itinerary comprise other 5-day itineraries. In another example, similar itineraries for a 5-day itinerary comprise itineraries comprising lengths of stay of 5-days plus or minus one day. In another example, similar itineraries are directed to the same property and have the same start date as the itinerary. For example, similar itineraries for an itinerary with a start date of Jan. 5, 2017 comprise other itineraries with a start date of Jan. 5, 2017. In an example, the search system generates a table for each similar itinerary comprising the extracted historical information data comprising the date the price changed and the start date of the itinerary. In an example, the search system calculates, for each similar itinerary, from the historical information data, a relative length of time comprising a length of time between the date of each change in price and the start date associated with the similar itinerary In bock 320, the search system 130 determines a number of changes for each property-itinerary combination comprising the property and for each of the property-itinerary combinations similar to the property-itinerary combination based on the historical information data. In an example embodiment, the search system may determine an average daily change rate for a group comprising the property-itinerary combination and each of the property-itinerary combinations similar to the property-itinerary combination. For example, a particular property-itinerary combination A changed price 10 times over the last 100 days, a similar property-itinerary combination B changed price 15 times over the last 100 days, and a similar property-itinerary combination C changed price 20 times over the last 100 days, resulting in an average change rate of 15 times over 100 days and an average daily change rate of 0.15 changes per day. In another example, instead of determining an average daily change rate, the search system determines, for the group comprising the property-itinerary combination and each of the property-itinerary combinations similar to the property-itinerary combination, an average monthly change rate, an average hourly change rate, an average yearly change rate, or another change rate specifying a number of changes over an appropriate duration of time.

In block 330, the search system 130 determines, for each property-itinerary combination comprising the property, an update frequency. In an example, the update frequency comprises comprising an average expected daily change rate or other expected change rate for a group comprising the respective property-itinerary combination and one or more property-itinerary combinations similar to the property-itinerary combination.

From block 330, the method 220 proceeds to block 230 in FIG. 2.

Returning to FIG. 2, in block 230, the for each current property-itinerary combination, the search system 130 determines a benefit value based on an expected impression weight based on a user 101 impression histories. The method for determining, by a search system 130, for each current property-itinerary combination, a benefit value based on an expected impression weight based on a user 101 impression histories is described in more detail hereinafter with reference to the method described in FIG. 4.

Figure 4:
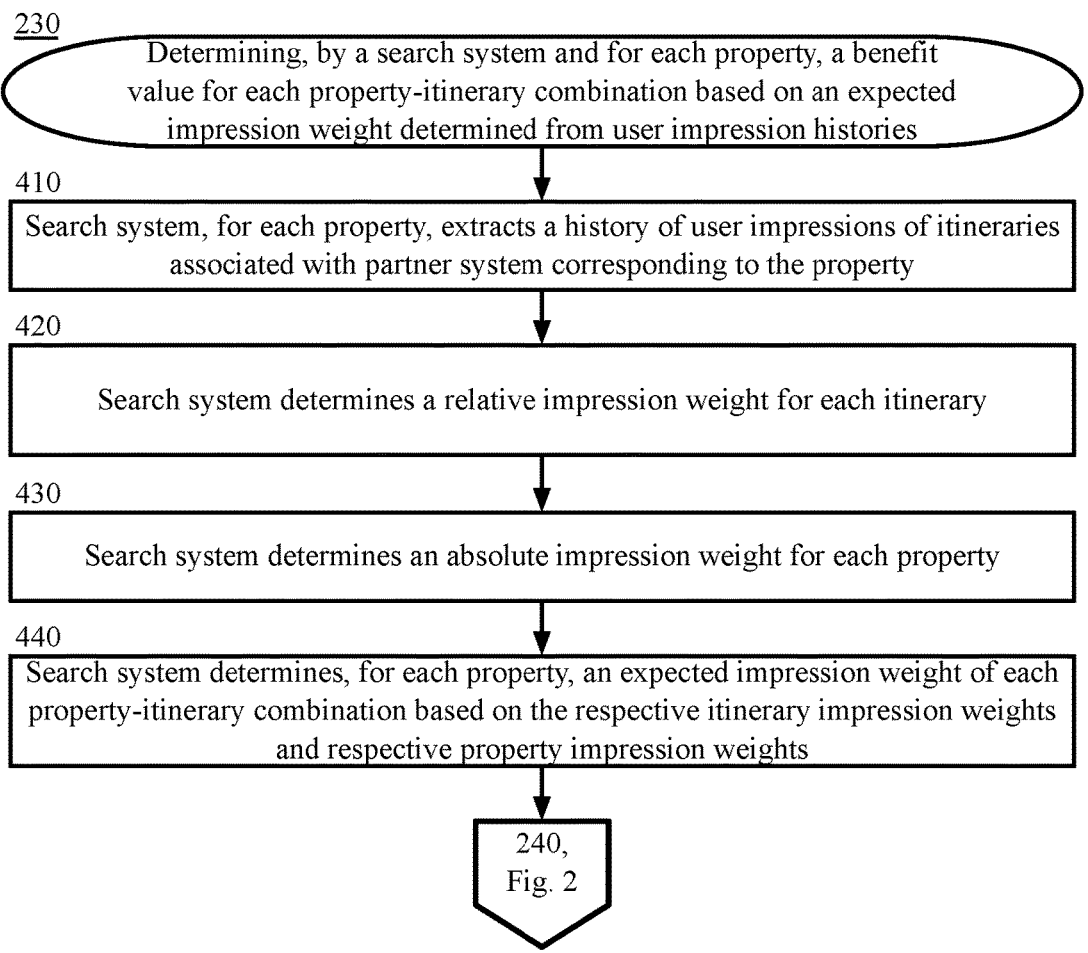
FIG. 4 is a block flow diagram depicting a method for determining, by a search system and for each property, a benefit value for each property-itinerary combination based on an expected impression weight determined from a user impression history, in accordance with certain example embodiments.

FIG. 4 is a block diagram depicting a method 230 for determining, by a search system 130, for each current property-itinerary combination, a benefit value based on an expected impression weight based on a user 101 impression histories, in accordance with certain example embodiments. The method 230 is described with reference to the components illustrated in FIG. 1.

In block 410, the search system 130 extracts a history of user 101 impressions of property-itinerary combinations associated with a partner system corresponding to the property. For example, the history of impressions comprises a record of date and time information for when one or more users using the search system searched for and received information associated with a particular itinerary comprising the property, a start date associated with each property-itinerary combination, an end date associated with each property-itinerary combination. In an example, the record is divided into time periods and includes a count of how many times the information for a particular property-itinerary combination was requested for each time period. For example, on a first day, the search system received 1000 requests for the property-itinerary combination, on a second day following the first day, the search system received 900 requests for the property-itinerary combination, and on a third day following the second day, the search system received 1800 requests for the property-itinerary combination. In an example, the search system comprises a history of user impressions for each day of the past three months, the past six months, the past year, the past two years, the past five years, or other appropriate time period. In an example embodiment, the search system determines a total number of times the information for each particular property-itinerary combination was requested during a period by determining a sum of individual periods. For example, the search system adds the number of requests for each of 90 days for a particular property-itinerary combination to arrive at a total number of requests for a 90-day period for the particular property-itinerary combination.

In block 420, the search system 130 determines a relative impression weight for each itinerary. For example, the search system, from the history of user impressions, determines the number of times that users requested information for each itinerary over a certain period of time. For example, a user impression comprises a request for a user for data associated with an itinerary. In this example, for each itinerary, the search system determines a relative impression weight by dividing the number of times that users requested information for the itinerary by the sum of the number of times that users requested information for the itinerary plus the number of times that users requested information for all other itineraries for which the search system 130 comprises historical data. For example, the relative impression weight comprises a proportion, percentage, fraction, or other expression. For example, the relative impression weight comprises a number between 0 and 1. For example, partner system A comprises 4 itineraries: itinerary 1, itinerary 2, itinerary 3, and itinerary 4. In this example, based on the history of user impressions, itinerary 1 was requested 100 times, itinerary 2 was requested 200 times, itinerary 3 was requested 50 times, and itinerary 4 was requested 150 times over a certain time period. In this example, the relative impression weight for itinerary 2 is (200 times)/(200 times+100 times+50 times+150 times)=0.40.

In these example embodiments, a higher relative impression weight for an itinerary indicates that the itinerary is more likely to be queried by users 101 compared to other itineraries. In these example embodiments, a lower relative impression weight for an itinerary indicates that the itinerary is less likely to be queried by users 101 compared to other itineraries. The impression weight for an itinerary may change as the search system 130 acquires more historical impression data of users 101.

In block 430, the search system 130 determines an absolute impression weight for each property. For example, the search system determines, from the history of user impressions, a total number of past user requests for property-itinerary combinations comprising the property. In this example, the search system divides the total number of past user requests for property-itinerary combinations comprising the property by the time period associated with the history of user impressions to arrive at an absolute impression rate. For example, the history of user impressions comprises user impression data for the past 90 days and the total number of past user requests for property-itinerary combinations comprising the property is 9000 requests. In this example, the absolute impression weight for the property comprises 100 requests per day. In other examples, absolute impression weights may be determined as a number of requests per month, a number of requests per hour, a number of requests per week, a number of requests per year, or a number of request per other appropriate period of time.

In block 440, the search system 130 determines an expected impression weight of each property-itinerary combination based on the respective itinerary impression weights and respective property impression weights. For example, the search system multiplies the itinerary impression weight for each itinerary by the absolute property impression weight for the property to determine an expected impression weight for each property-itinerary combination. For example, the itinerary impression weight for a particular itinerary is 0.02, the absolute impression weight for the property is 10,000 requests per day, and the resulting expected impression weight of the property-itinerary combination is 500 requests per day.

From block 440, the method 230 proceeds to block 240 in FIG. 2.

Returning to FIG. 2, in block 240, for each partner system, the search system 130 determines a utility value for each property-itinerary combination based on the corresponding expected update frequency and corresponding expected impression weight. As previously discussed, the search system may determine an expected update frequency for each property-itinerary combination based on historical information data. Also, the search system may determine an expected impression weight of each property-itinerary combination based on a history of user impressions of itineraries describing when users requested information concerning the property-itinerary combinations. In an example embodiment, the search system determines a utility value for each property-itinerary combination associated with a particular partner system based on the expected update frequency corresponding to the property-itinerary combination and the expected impression weight corresponding to the property-itinerary combination. For example, the search system determines a utility value for each property-itinerary combination associated with a particular partner system by dividing the corresponding expected impression weight by the expected update frequency. In an example, a utility value is a unit-less value. For example, for a particular property-itinerary combination, the expected impression weight is 500 requests per day and the expected update frequency is 0.1 changes per day. In this example, the utility value for the particular property itinerary combination is 5,000.

In block 250, the search system 130 ranks the property-itinerary combinations based on utility value and determines a utility value threshold to satisfy bandwidth constraints. The method for ranking, by a search system 130, property-itinerary combinations based on utility value and determining a utility value threshold to satisfy bandwidth constraints is described in more detail hereinafter with reference to the method described in FIG. 5.

Figure 5:
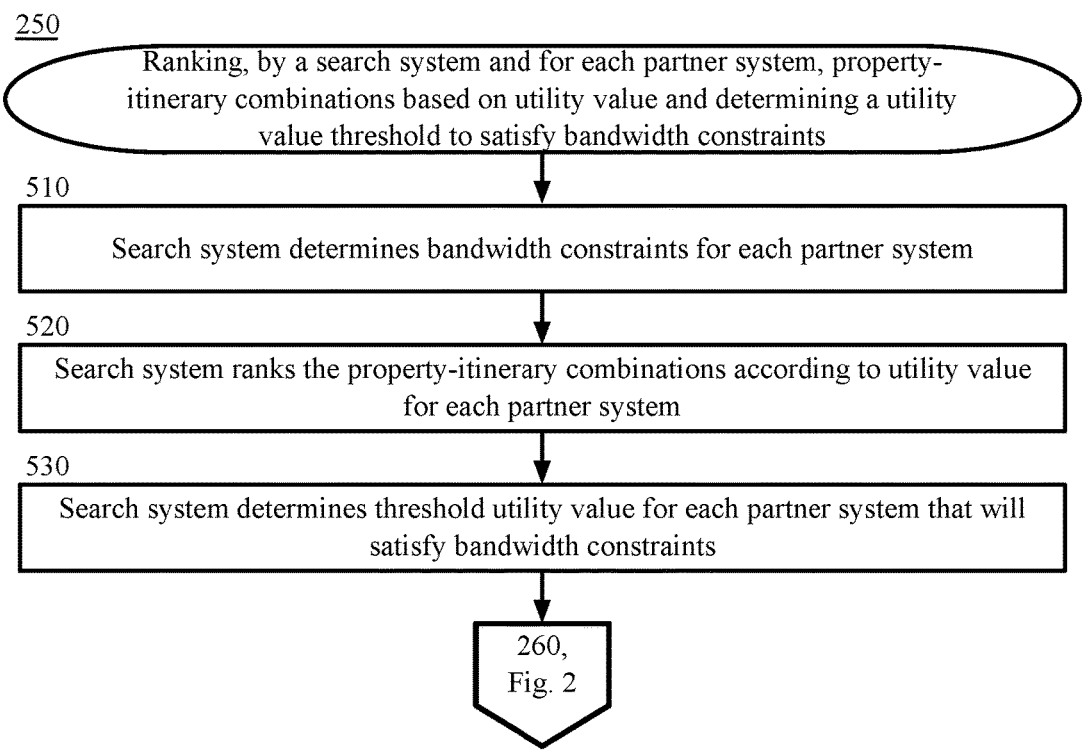
FIG. 5 is a block flow diagram depicting a method for ranking, by a search system and for each partner system, property-itinerary combinations based on utility value and determining a utility value threshold to satisfy bandwidth constraints, in accordance with certain example embodiments.

FIG. 5 is a block diagram depicting a method 250 for ranking, by a search system 130, property-itinerary combinations based on utility value and determining a utility value threshold to satisfy bandwidth constraints, in accordance with certain example embodiments. The method 240 is described with reference to the components illustrated in FIG. 1.

In block 510, the search system 130 ranks the property-itinerary combinations according to utility value for each partner system 140. As previously discussed, the search system may determine an expected update frequency for each property-itinerary combination based on historical information data. Also, the search system may determine an expected impression weight of each property-itinerary combination based on a history of user impressions of itineraries describing when users requested information concerning the property-itinerary combinations. In an example embodiment, the search system determines a utility value for each property-itinerary combination associated with a particular partner system based on the expected update frequency corresponding to the property-itinerary combination and the expected impression weight corresponding to the property-itinerary combination. For example, the search system determines a utility value for each property-itinerary combination associated with a particular partner system by dividing the corresponding expected impression weight by the expected update frequency. In an example, a utility value is a unit-less value. For example, for a particular property-itinerary combination, the expected impression weight is 500 requests per day and the expected update frequency is 0.1 changes per day. In this example, the utility value for the particular property itinerary combination is 5,000. In an example embodiment, for each partner system, the search system determines a utility value for each property-itinerary combination associated with the partner system based on the determined expected update frequency and the determined expected impression weight for the corresponding property-itinerary combination. The search system ranks the property-itinerary combinations according to utility value for each partner system. In an example, the search system ranks, in a separate list for each partner system, the property-itinerary combinations in ascending or descending order according to utility value.

In block 520, the search system 130 determines bandwidth constraints for each partner system 140. For example, for each partner system, the search system is limited to a certain number of queries per time period for property-itinerary combinations. In another example, for each partner system, the search system is otherwise limited to a certain number queries per second, queries per minute, or queries per other defined unit of time. In an example, each partner system defines a bandwidth usage for the time period to the search system. The bandwidth usage may vary over time so the search system may communicate, via the network, with the partner system to determine the current bandwidth constraints. In an example, the search system determines a bandwidth usage for each property-itinerary combination on the list of property-itinerary combinations ranked according to utility value. For example, for each partner system 140, the search system 130 is limited to a certain number of queries per unit of time for property-itinerary combinations. In another example, for each partner system 140, the search system 130 is otherwise limited to a certain number queries per second, queries per minute, or queries per other defined unit of time. In an example, each partner system 140 defines a bandwidth usage for the unit of time to the search system. The bandwidth usage may vary over time so the search system 130 may communicate, via the network, with the partner system to determine the current bandwidth constraints. In an example, the search system 130 determines a bandwidth usage for each property-itinerary combination on the list of property-itinerary combinations ranked according to utility value.

In block 530, the search system 130 determines a threshold utility value for each partner system 130 that will satisfy the bandwidth constraints. In an example embodiment, the search system chooses a threshold utility value such that the sum of the bandwidth usages for querying each property-itinerary combination above the utility value would approach but not exceed the total allowed bandwidth usage. For example, the search system determines a threshold utility value for a partner system that uses 99.5% of the allowed bandwidth usage.

From block 530, the method 250 proceeds to block 260 in FIG. 2.

Returning to block 260, in FIG. 2, the search system 130 schedules property-itinerary combinations having values greater than threshold utility value for querying. In an example embodiment, the search system 130 chooses a threshold utility value such that the sum of the bandwidth usages for querying each property-itinerary combination above the utility value would approach but not exceed the total allowed bandwidth usage. For example, the search system 130 determines a threshold utility value for a partner system that uses 99.5% of the allowed bandwidth usage. For example, the search system removes from each partner system list the property-itinerary combinations that comprise a lower utility value than the determined utility value threshold. Further, the search system schedules or spaces the queries such that any further bandwidth constraints are satisfied. For example, a partner system may allow 60,000 queries per minute but no more than 1,000 queries per second. In this example, the search system may schedule the queries in order based on the list of property-itinerary combinations ranked according to utility value in slots of 1,000 queries that are sent in batches at one second intervals.

In block 270, the search system 130 conducts queries with each partner system 140 according to the query schedule. In an example, the search system conducts the queries with the partner systems according to the query schedules by submitting each query at the scheduled time over the network to the appropriate partner system. In an example query comprises a property identifier and a description of an itinerary-property combination comprising a start date and a termination date. For example, the search system submits a query for an itinerary-property combination comprising an itinerary between Dec. 5, 2017 and Dec. 15, 2017 for property A. In this example, the partner system receives each query over the network and transmits a response to the query over the network comprising updated information for the property-itinerary combination. In this example, the search system receives, over the network, the responses to each query submitted to the partner system comprising the updated property-itinerary information. For example, the updated property-itinerary combination comprises updated price information. In an example, the search system determines query schedules and/or modifies existing query schedules at predetermined intervals. For example, the search system determines a new query schedule for each partner system every 30 seconds, every 5 minutes, every hour, once a day, or at another appropriate interval. For example, the search system may review current property-itinerary combinations, determine a utility value for each property-itinerary combination and bandwidth constraints, and schedule property-itinerary combination queries. In an example, the search system provides the updated information received from the one or more partner systems for property-itinerary combinations to one or more users in response to one or more queries for the property-itinerary combinations. The search system receives an example user query for a particular property-itinerary combination over the network and provides a response to the query comprising the updated information for the particular property-itinerary combination.

In an example, the search system 130 buffers queries before submitting a group of individual queries as a single query to one or more partner systems 140. Example costs associated with a query comprise both a fixed cost and a variable cost. A variable cost depends on the quantity of property-itinerary combinations contained within a single query message. In this example, partner systems 140 may prefer single itinerary queries for multiple properties to reduce costs. For example, partner systems 140 may comprise systems that are configured to answer information queries for property-itinerary combinations comprising a shared start date across multiple properties. For example, a partner system 140 may process a single query for 100 itineraries comprising one or more properties but having the same start date associated with the itinerary. In certain examples, the search system 130 queries one or more partner systems 130 by first buffering up queries for itineraries comprising the same start date until there is either a full query comprising a predetermined threshold number of individual queries or until the query scheduling process is complete. For example, the predetermined threshold number of individual queries comprises 100 itinerary queries, 50 itinerary queries, 1000 itinerary queries, or other appropriate number of itinerary queries.

In other examples, after determining a query schedule for each partner system, the search system determines or otherwise receives notification, via the network 120, that the bandwidth constraints associated with the one or more partner systems has changed. In this example, the search system modifies one or more threshold utility values associated with query schedules for the one or more partner systems whose bandwidth constraints changed in accordance with the change in bandwidth. For example, the search system 130 may decrease the utility threshold to allow for more queries when a bandwidth allowance is raised and may increase the utility threshold to reduce the number of scheduled queries when a bandwidth allowance is lowered.

In an example embodiment, the search system 130 receives, over the network 120, an example user 101 query for a particular property-itinerary combination over the network and provides a response, via the network 120 to the query comprising the updated information for the particular property-itinerary combination. For example, the user 101 accesses, via the user computing device 110 the search application 113 and submits a search query via the search application 113 for a particular property-itinerary combination and the search application 113 communicates, via the network 120, the query to the search system 130. In this example, the search system 130 receives, via the network 120, the user 101 query and provides, via the network 120 to the user computing device 110, information associated with the property-itinerary combination including any updated information received from an associated partner system 140.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to schedule queries for information, comprising:
for each property-itinerary combination in historical data for a plurality of property-itinerary combinations provided by one or more partner systems, each property-itinerary combination comprising the identity of a property and a corresponding itinerary:
determining, using the one or more computing devices, a number of changes to the historical data for each of a group of property-itinerary combinations comprising the property-itinerary combination and one or more other similar property-itinerary combinations;
determining, using the one or more computing devices, an update frequency comprising an average expected change rate for the group of property-itinerary combinations based on the number of changes to the historical data for each of the group of property-itinerary combinations;

determining, using the one or more computing devices, an impression weight for the itinerary of the property-itinerary combination relative to all other itineraries in the plurality of property-itinerary combinations based on a history of user impressions;

determining, using the one or more computing devices, an impression weight for the property associated with the property-itinerary combination based on the history of user impressions;

determining, using the one or more computing devices, an expected impression weight of the property-itinerary combination based on the impression weight for the itinerary and the impression weight for the property;

determining, using the one or more computing devices, a bandwidth usage for a query of the property-itinerary combination;

determining, using the one or more computing devices, a utility value for the property-itinerary combination based on the determined expected impression weight and the determined update frequency;

ranking, using the one or more computing devices and for each partner system, each property-itinerary combination associated with the partner system according to the determined utility value;

determining, using the one or more computing devices, a threshold utility value for each partner system based on bandwidth constraints corresponding to the respective partner system, the threshold utility value determined such that a query to the respective partner system for all property-itinerary combinations having a utility value greater than the threshold utility value would not exceed the bandwidth constraints set by the respective partner system based on the bandwidth usage for a query of each property-itinerary combination; and conducting, using the one or more computing devices and with each partner system, queries for property-itinerary combinations having a determined utility value above a specified utility value.

2. The method of claim 1, wherein a property comprises a particular hotel location and a property-itinerary combination comprises a request for a particular hotel location between a start date and an end date.

3. The method of claim 1, wherein the utility value for each property-itinerary combination comprises a numerical value greater than zero.

4. The method of claim 1, further comprising receiving, using the one or more computing devices, the bandwidth constraints from each partner system, wherein the bandwidth constraints comprise a limit of the number of queries over a unit of time.

5. The method of claim 1, further comprising receiving, using the one or more computing devices and from each partner system, a response for each query for each property-itinerary combination comprising updated information for each property-itinerary combination.

6. The method of claim 1, further comprising generating, using the one or more computing devices, and from the property-itinerary combinations comprising determined utility values greater than the utility value threshold, a query schedule for each partner system, wherein the queries are transmitted to each partner system according to the generated query schedule.

7. The method of claim 1, wherein the query schedule comprises property-itinerary combinations comprising utility values above the threshold utility value ranked according to utility value, wherein the property-itinerary combinations comprising higher utility values are scheduled to be queried first to the partner system before property-itinerary combinations comprising lower utility values.

8. The method of claim 1, wherein the historical information data comprises price data and wherein the updated information comprises one or more updates to price data.

9. The method of claim 1, wherein determining, for each property-itinerary combination, the utility value for the property-itinerary combination comprises diving the determined expected impression weight by the determined update frequency.

10. A computer program product, comprising:
a non-transitory computer-readable medium having computer-executable program instructions embodied thereon that when executed by a computer cause the computer to schedule queries for information according to utility value to satisfy bandwidth constraints, the computer-executable program instructions comprising:

for each itinerary combination in historical information data for a plurality of property-itinerary combinations provided by one or more partner systems, each property-itinerary combination comprising the identity of a property and a corresponding itinerary:

computer-executable program instructions to determine a number of changes to historical information data for each of a group of property-itinerary combinations comprising the property-itinerary combination and one or more other similar property-itinerary combinations;

computer-executable program instructions to determine an update frequency comprising an average expected change rate for the group of property-itinerary combinations based on the number of changes to the historical information data for each of the group of property-itinerary combinations;

computer-executable program instructions to determine an impression weight for the itinerary of the property-itinerary combination relative to all other itineraries in the plurality of property-itinerary combinations based on a history of user impressions;

computer-executable program instructions to determine an impression weight for the property associated with the property-itinerary combination based on the history of user impressions;

computer-executable program instructions to determine an expected impression weight of the property-itinerary combination based on the impression weight for the itinerary and the impression weight for the property;

computer-executable program instructions to determine a bandwidth usage for a query of the property-itinerary combination;

computer-executable program instructions to determine a utility value for the property-itinerary combination based on the determined expected impression weight and the determined update frequency;

computer-executable program instructions to rank, for each partner system, each property-itinerary combination associated with the partner system according to the determined utility value;

computer-executable program instructions to determine a threshold utility value for each partner system based on bandwidth constraints corresponding to the respective partner system, the threshold utility value determined such that a query to the respective partner system for all property-itinerary combinations having a utility value greater than the threshold utility value would not exceed the bandwidth constraints set by the respective partner system based on the bandwidth usage for a query of each property-itinerary combination; and computer-executable program instructions to conduct, with each partner system, queries for property-itinerary combinations having a determined utility value above a specified utility value.

11. The computer program product of claim 10, wherein a property comprises a particular hotel location and a property-itinerary combination comprises a request for a particular hotel location between a start date and an end date.

12. The computer program product of claim 10, further comprising computer-executable program instructions to generate, from property-itinerary combinations comprising utility values greater than the utility value threshold, a query schedule for each partner system, wherein the queries are transmitted to each partner system according to the generated query schedule.

13. The computer program product of claim 10, wherein the utility value for each property-itinerary combination comprises a numerical value greater than zero.

14. The computer program product of claim 10, wherein the historical information data comprises price data and wherein the updated information comprises one or more updates to price data.

15. The computer program product of claim 10, further comprising the computer-executable program instructions to retrieve the historical information data for property-itinerary combinations for properties associated with the one or more partner systems.

16. The computer program product of claim 10, further comprising computer-executable program instructions to retrieve a history of user impressions for the property-itinerary combinations.

17. A system to schedule queries for information according to utility value to satisfy bandwidth constraints, comprising:
 a storage device; and
 a processor communicatively coupled to the storage device, wherein the processor executes application code instructions that are stored in the storage device to cause the system to:
  for each property-itinerary combination in historical data for a plurality of property-itinerary combinations provided by one or more partner systems, each property-itinerary combination comprising the identity of a property and a corresponding itinerary:
   determine a number of changes to the historical data for each of a group of property-itinerary combinations comprising the property-itinerary combination and one or more other similar property-itinerary combinations;
   determine an update frequency comprising an average expected change rate for the group of property-itinerary combinations based on the number of changes to the historical data for each of the group of property-itinerary combinations;
   determine an impression weight for the itinerary of the property-itinerary combination relative to all other itineraries in the plurality of property-itinerary combinations based on a history of user impressions;
   determine an impression weight for the property associated with the property-itinerary combination based on the history of user impressions;
   determine an expected impression weight of the property-itinerary combination based on the impression weight for the itinerary and the impression weight for the property;
   determine a bandwidth usage for a query of the property-itinerary combination;
   determine a utility value for the property-itinerary combination based on the determined expected impression weight and the determined update frequency;
  rank, for each partner system, each property-itinerary combination associated with the partner system according to the determined utility value;
  determine a threshold utility value for each partner system based on bandwidth constraints corresponding to the respective partner system, the threshold utility value determined such that a query to the respective partner system for all property-itinerary combinations having a utility value greater than the threshold utility value would not exceed the bandwidth constraints set by the respective partner system based on the bandwidth usage for a query of each property-itinerary combination; and
  conduct, with each partner system, queries for property-itinerary combinations having a determined utility value above a specified utility value.

18. The system of claim 17, wherein a property comprises a particular hotel location and a property-itinerary combination comprises a request for a particular hotel location between a start date and an end date.

19. The system of claim 17, wherein the processor is further configured to execute computer-readable program instructions stored in the storage device to cause the system to generate, from the property-itinerary combinations comprising utility values greater than the utility value threshold, a query schedule for each partner system, wherein the queries are transmitted to each partner system according to the generated query schedule.

20. The system of claim 17, wherein the utility value for each property-itinerary combination comprises a numerical value greater than zero.

\* \* \* \* \*